(12) United States Patent
Schillgalies et al.

(10) Patent No.: US 6,372,861 B1
(45) Date of Patent: Apr. 16, 2002

(54) CYANATE RESIN, POLYEPOXIDE AND METAL COMPLEX CURING AGENT

(75) Inventors: Jürgen Schillgalies, Moers; Heinz-Günter Reichwein, Kamp-Lintfort; Andreas Palinsky, Duisburg; Achim Kaffee, Solingen, all of (DE)

(73) Assignee: Bakelite A.G. (DE)

( * ) Notice: Subject to any disclaimer, the term of this patent is extended or adjusted under 35 U.S.C. 154(b) by 0 days.

(21) Appl. No.: 09/487,110

(22) Filed: Jan. 19, 2000

(30) Foreign Application Priority Data

Feb. 9, 1999 (DE) .......................... 199 05 448

(51) Int. Cl.$^7$ .......................... C08L 61/14; C08L 63/02
(52) U.S. Cl. .......................... 525/486; 525/523
(58) Field of Search .................. 525/523, 486

(56) References Cited

U.S. PATENT DOCUMENTS 5,350,635 A * 9/1994 Pokorny .................. 528/96
5,395,913 A * 3/1995 Bottcher et al. .......... 528/92

FOREIGN PATENT DOCUMENTS

| DE | 1110868 | * | 7/1961 |
| GB | 771631 | * | 4/1957 |
| JP | 55-112256 A | * | 8/1980 |
| JP | 56-18615 A | * | 2/1981 |
| WO | 91/13925 | | 9/1991 |
| WO | 96/17020 | | 6/1996 |
| WO | WO-96/20242 A1 | * | 7/1996 |
| WO | 97/47689 | | 12/1997 |

* cited by examiner

Primary Examiner—Robert E. L. Sellers
(74) Attorney, Agent, or Firm—Bierman, Muserlian and Lucas

(57) ABSTRACT

A curable mixture comprising at least one cyanate resin, at least one epoxide compound with more than one epoxy group per molecule, and a metal formula selected from the group consisting of $ML_xB_y$, $M[SR]_xB_y$, $M[SR]_x(N)_y$, $M(PHal)_m$ and $M(PHal)_m(N)_n$ wherein M is a cation of a complexing metal, SR is an organic or inorganic acid residue, L is a chelating ligand, B is a Lewis base, PHal is an ion of a pseudohalide, N is a nitrogen base, x is an integer from 1 to 8, y is an integer from 1 to 5, z is an integer from 7 to 8, m is an integer from 2 to 3 and n is an integer from 1 to 2.

3 Claims, No Drawings

CYANATE RESIN, POLYEPOXIDE AND METAL COMPLEX CURING AGENT

FIELD OF THE INVENTION

Curable mixtures of cyanate resins and epoxide compounds having longer processing times and a reduced increase of viscosity.

STATE OF THE ART

Curable mixtures of cyanate resins and epoxide compounds are known to produce flame resistant/retardant cured products having excellent mechanical and electrical properties making them useful for the production of high quality printed circuit boards. U.S. Pat. No. 3,562,214 discloses curing mixtures of aromatic cyanate esters and multifunctional epoxide compounds without curing agents at temperatures of about 180° C. However, the reactions between the resins follows so complete curing of the products is not attained leading those skilled in the art to consider the use of curing agents necessary.

U.S. Pat. No. 4,477,629 teaches the crosslinking of aromatic cyanate esters and epoxy resins in the presence of a curing catalyst which is preferably cobalt octate and naphthenate at a curing temperature of 70 to 350° C. U.S. Pat. No. 4,612,359 discloses curing mixtures of cyanate esters, cyanamides and epoxy resins with acidic catalysts such as borotrifluoride etherate. EPO No. 0,794,979 discloses curing mixtures of aromatic cyanate resins and epoxy resins with curing catalysts such as diazabicyclo [2,2,2]-octane, catechol, 1,1-dimethyl-3-phenyl urea, imidazoles, alkylphenols or heavy metal salts such as octoates, acetyl-acetonates or naphthenates.

However, all of these curing methods have the disadvantage that the viscosity of the mixtures to be cured increases very rapidly, particularly at the processing temperatures, so that uniform wetting of fibers during impregnation of fibers or fabrics cannot be obtained leading to weak sites in products produced from these mixtures.

OBJECTS OF THE INVENTION

It is an object of the invention to provide novel capable mixtures of cyanate resins and epoxide compounds which have a reduced increase in viscosity, even at processing temperatures, permitting longer processing times while leading to complete curing of the products at the same curing rate at conventional curing temperatures.

This and other objects and advantages of the invention will become obvious from the following detailed description.

THE INVENTION

The novel curable mixtures of the invention are comprised of at least one cyanate resin and at least one epoxide compound and a metal complex curing agent of a formula selected from the group consisting of $ML_xB_y$, $M[SR]_xB_y$, $M[SR]_x(N)_y$, $M(PHal)_m$ and $M(PHal)_m(N)_n$ wherein M is a cation of a complexing metal, SR is an organic or inorganic acid residue, L is a chelating ligand, B is a Lewis base, PHal is an ion of a pseudohalide, N is a nitrogen base, x is an integer from 1 to 8, y is an integer from 1 to 5, z is an integer from 7 to 8, m is an integer from 2 to 3 and n is an integer from 1 to 2. The mixtures are useful for the production of high quality printed circuit boards, for the impregnation of fibers in filament winding processes and for the production of molded materials for RTM (resin transfer method) or RIM (reaction injection molding) and other molding processes.

The metal complex curing agents of the invention catalyze extremely well the mixture of cyanate resins and epoxide compounds with a substantially improved processing time at processing temperatures of up to 10 hours which is a great production advantage in that the claimed mixtures can be processed during a single working cycle.

The metal complex curing agents of $ML_xB_y$ and $M[SR]_xB_y$ are described as curing catalysts for epoxy resins in WO 91/13,925 and the metal complex curing agents of $(PHal)_m$ and $M(PHal)_m(N)_n$ are described as curing catalysts for epoxy resins in German Patent Application No. 198 48 329.5 which is incorporated by reference. Suitable pseudohalides represented by "PHal" include a cyanate (—OCN) or thiocyanate (—SCN) ion. It is surprising that the curing agents not only catalyze the curing of epoxide compounds but also crosslink the cyanate resins with the epoxide compounds which produces a new copolymer in which the two resin components are crosslinked instead of forming an epoxy resin matrix with embedded cyanate resin as one skilled in the art would anticipate. The mixtures cured with the catalysts of the formula $M(PHal)_m$ and $M(PHal)_m(N)_n$ have the additional advantage of having glass transition temperatures (Tg values) greater by 5 to 15° C.

It is known from EP-B 0,794,979 that the Tg values of cyanate resin/diepoxy resin polymer can be increased by the addition of tri- and tetrafunctional epoxide compounds whereby the elasticity of brittle per se polymers is lowered still further. If higher Tg values are achieved with the said curing agents, the amount of added tri- and tetrafunctional epoxide compounds to be added to obtain the Tg values of the prior art can be reduced to improve the elasticity of the cured polymers at lower cost.

Preferably, the amount of metal complex curing agent to be added to the cyanate resin-epoxide mixture is 0.05 to 10% by weight of the said mixture. The resulting mixtures are storage stable at room temperature for several days without any significant increase in viscosity. At processing temperatures of 40 to 50° C., a slow rise in viscosity will occur whereby the mixtures are still processable for several hours and yield good wetting and impregnation of fibers and fabrics. The curing agents also make possible the use of cyanate resin-epoxide compound mixtures for the production of molding materials for RTM and RIM and comparable molding processes.

Examples of cyanate resins are known compounds of the formula

    VI where R is a mono- or polynuclear aromatic or unsubstituted or substituted alkylaromatic and n is an integer greater than 1. Preferred cyanate resins are those of the formula

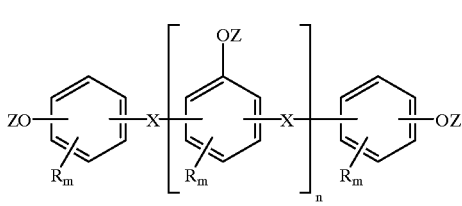    VII wherein Z is —CN or hydrogen, X is a divalent organic group such as $-(CH_2)-$, $-C(CH_3)_2-$ or

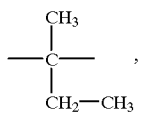

R is an organic group non-reactive under the curing conditions, m is an integer from 0 to 4 and n is an integer of 0 to 10. Examples of R are alkyl, halogen, ether or ester groups.

More preferred cyanate resins have the formula

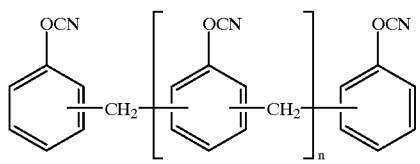

VIII wherein n is an integer of 0 to 5. These resins are triazines commercially available under the mark Primaset®.

The epoxide compounds are all epoxide compounds with more than one epoxy group per molecule and diepoxy compounds are preferred. As noted above, the addition of tri-, tetra- or higher functional epoxides may be added to increase the Tg values. Examples of preferred higher functional epoxide compounds are polyglycidyl ethers of novolaks.

If pure diglycidyl ethers of bisphenols are used as the epoxide compounds, it was surprisingly found that there is a further increase in the Tg values of the cured polymer. The pure diglycidyl ethers of bisphenols are produced by reacting epichlorohydrin with the corresponding bisphenols followed by distillation to remove all impurities from the higher molecular weight resin molecules which are free from water as compared to normal epoxy resins which have about 0.1% of water.

Examples of bisphenols are those of the formula

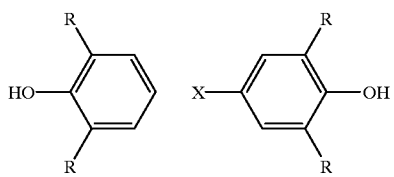

IX wherein X is selected from the group consisting of —CH$_2$—,

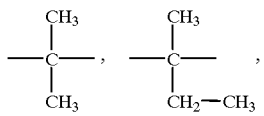

a five or six member cyclo hydrocarbon, —S— and —SO$_2$— and R is hydrogen and methyl or bromo. Preferred bisphenols are bisphenol A and bisphenol F.

Since the Tg values are increased by the use of pure diglycidyl ethers of bisphenols, the amount of tri- and higher functional epoxide compounds can be reduced to obtain a further improvement in elasticity of the cured polymers. Another surprising advantage of the use of the pure diglycidyl of the bisphenols is reduced shrinkage of the mixture as compared to the prior art mixture as well as lower viscosity. This is particularly advantageous when using the mixtures as impregnating resins in filament winding processes where the temperature of the impregnating resins is kept 5 to 10° C. lower, if possible, than in other impregnation applications.

The mixtures of the invention can contain 10 to 90% by weight of cyanate resin and 90 to 10% by weight of epoxide compound. For economical reasons, the mixture contain 10 to 50%, preferably 10 to 40%, by weight of cyanate resin.

The mixtures of the invention can also contain additional known components such as additional fillers and additives such as curing agents, solvents, retarding agents, accelerants and/or additional resins.

In the following examples, there are described several preferred embodiments to illustrate the invention. However, it is to be understood that the invention is not intended to be limited to the specific embodiments.

EXAMPLES

The mixtures of cyanate resin, epoxide compound and metal complex curing agents were produced by mixing at 45° C. The initial viscosity and viscosity at various storage times were determined at 45° C. Samples of the compositions were cured with temperature cycles of 75 minutes at 100° C., 90 minutes at 130° C., 150 minutes at 150° C. and 240 minutes at 210° C. after which the Tg values were determined. The results are reported in the following table.

The composition components were a commercially available polyphenol cyanate ester of formula VIII with n being about 2.6. The epoxide component was a commercially available bisphenol F resin with an epoxide equivalent of 172 and a viscosity of 4,500 mPas at 25° C. or freshly distilled bisphenol A free of water.

The curing agents used were a) ZnOct (zinc dioctoate), b) ZnPHalMIM(bis(1-methyl-imidazole)-zinc(II)-dicyanate produced with stoichiometric amounts of aqueous solutions of zinc chloride and sodium cyanate and 1-methyl-imidazole), c) Zn(Oct)MIM(bis(1-methyl-imidazole)-zinc (II)-dioctoate by reaction of stoichiometric amounts of zinc octoate and 1-methyl-imidazole at 40° C. and d) Zn(Ac) MIM(bis(1-methyl-imidazole)-zinc(II)-diacetyl-acetonate produced according to DD 292,463. All amounts are in parts by weight.

Example 1

| Bisphenol A | 30 |
|---|---|
| Cyanate resin | 20 |
| ZnPHalMIM | 0.13 |

Example 2 (Comparison Example)

| Bisphenol A | 30 |
|---|---|
| Cyanate resin | 20 |
| ZnOct | 0.1 |

Example 3

| | |
|---|---|
| Epoxy resin | 30 |
| Cyanate resin | 20 |
| ZnPhalMIM | 0.13 |

Example 4 (Comparison Example)

| | |
|---|---|
| Epoxy resin | 30 |
| Cyanate resin | 20 |
| ZnOct | 0.1 |

Example 5

| | |
|---|---|
| Epoxy resin | 30 |
| Cyanate resin | 20 |
| Zn(Oct)MIM | 0.13 |

Example 6 (Comparison Example)

| | |
|---|---|
| Epoxy resin | 30 |
| Cyanate resin | 20 |
| ZnOct | 0.05 |
| 1-methylimidazole | 0.05 |

Example 7

| | |
|---|---|
| Epoxy resin | 30 |
| Cyanate resin | 20 |
| Zn(Ac)MIM | 0.13 |

Results:

TABLE

| | | Viscosity [mPas] after storage at 45° C. of | | | | | |
|---|---|---|---|---|---|---|---|
| Example | $T_g$ [° C.] | 0 min | 30 min | 105 min | 165 min | 215 min | 17 h |
| 1 | 177 | 1520 | 1640 | 1800 | 1960 | 2040 | 5200 |
| 2 | 168 | 1520 | 1800 | 2480 | 3020 | 3520 | 18500 |
| 3 | 170 | 2000 | 2000 | 2400 | 2760 | 2840 | 8700 |
| 4 | 155 | 2000 | 3120 | 3680 | 4480 | 4980 | 25600 |
| 5 | | 2000 | 2350 | 2720 | 2940 | 3160 | |
| 6 | | 2000 | 3100 | 3720 | 4620 | 5240 | |
| 7 | | 2000 | 2500 | 2840 | 3010 | 3260 | |

Various modifications of the compositions and methods of the invention may be made without departing from the spirit or scope thereof and it is to be understood that the invention is intended to be limited only as defined in the appended claims.

What we claim is:

1. A curable mixture comprising at least one cyanate resin and at least one epoxide compound with more than one epoxy group per molecule and a metal complex curing agent of the formula $M(Phal)_m(N)_n$ wherein M is a cation of a complexing metal, Phal is an ion of —OCN or —SCN, N is a nitrogen base, m is an integer from 2 to 3 and n is an integer from 1 to 2.

2. A mixture of claim 1 wherein the epoxide compound is a diglycidyl ether of a bisphenol.

3. A mixture of claim 2 wherein the epoxide compound is a diglycidyl ether of bisphenol A or bisphenol F.

* * * * *